United States Patent [19]

Towlson

[11] Patent Number: 4,724,355
[45] Date of Patent: Feb. 9, 1988

[54] BACKSIDE DISC FLUSH FOR LIGHT VALVE PROJECTOR

[75] Inventor: Howard E. Towlson, Baldwinsville, N.Y.

[73] Assignee: General Electric Company, Princeton, N.J.

[21] Appl. No.: 877,901

[22] Filed: Jun. 24, 1986

[51] Int. Cl.$^4$ .............................................. H01J 29/12
[52] U.S. Cl. ................................... 313/465; 350/361; 358/62; 358/233
[58] Field of Search ..................... 313/465; 358/60, 62, 358/231, 233; 350/267, 269, 361

[56] References Cited

U.S. PATENT DOCUMENTS 3,874,786  4/1975  Towlson ............................. 350/361

Primary Examiner—David K. Moore
Assistant Examiner—K. Wieder
Attorney, Agent, or Firm—Eugene M. Whitacre; Vincent J. Coughlin, Jr.

[57] ABSTRACT

A flushing system is provided for a light valve of the Schlieren dark field type. A small amount of filtered fluid is injected into the space between the rotating disc and the output window of the light valve. This is done by injecting the fluid through the center disc bearing, thereby providing a uniform radial flow outwardly from the center and flushing out any particles in the space and preventing any particles in the surrounding fluid from moving into the raster area. By properly regulating the flow of the center flush fluid, the disc can be floated off the support during rotation. This reduces wear generated particles which contribute to substrate buildup and subsequent loss of light throughput. In addition, erratic disc motion caused by a stick and slip frictional effect is reduced.

3 Claims, 6 Drawing Figures

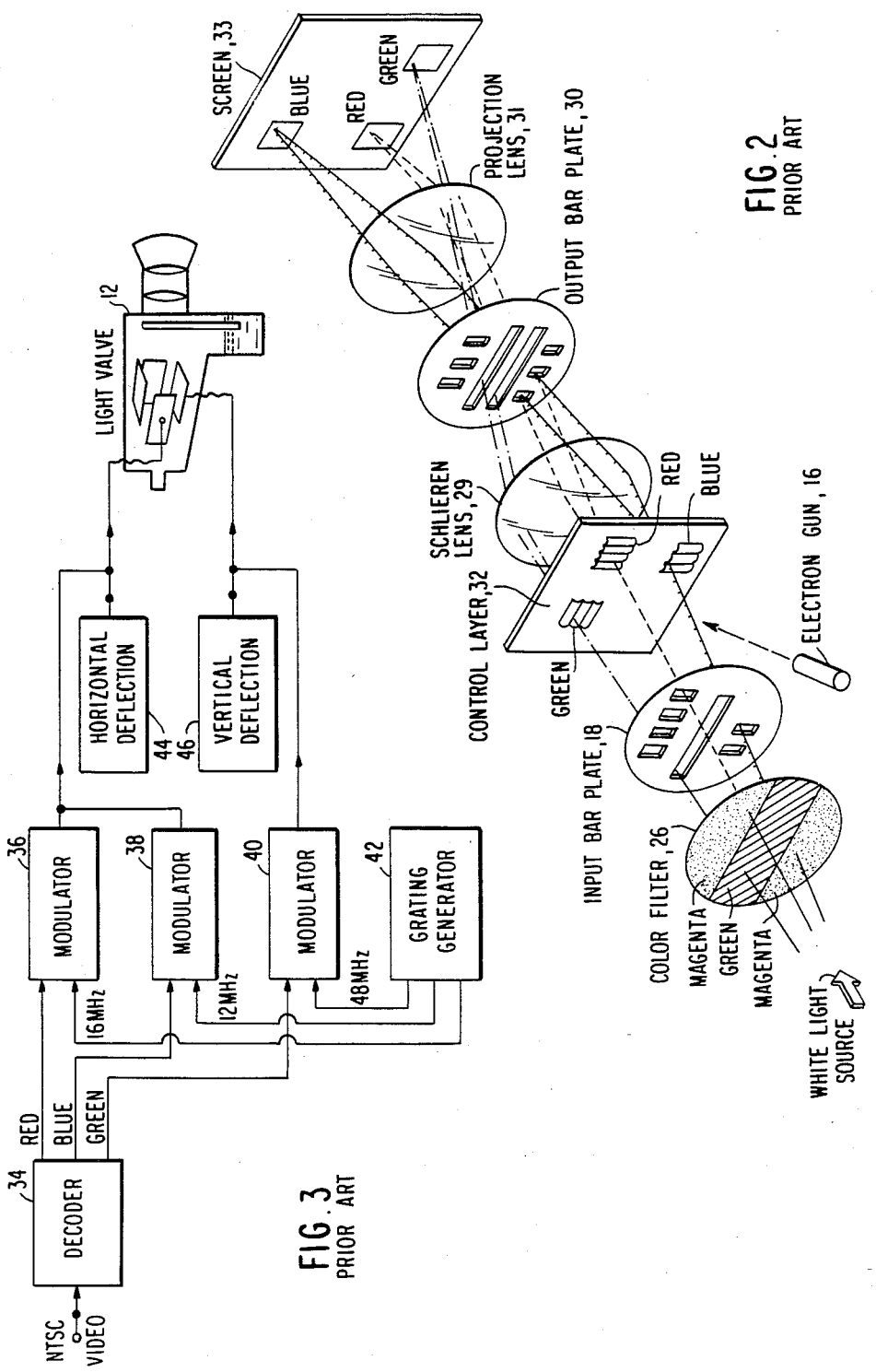

BACKSIDE DISC FLUSH FOR LIGHT VALVE PROJECTOR

BACKGROUND OF THE INVENTION

1. Field of the Invention

The present invention generally relates to improvements in light valve projection systems of the Schlieren dark field type and, more particularly to a flushing system which is effective in removing particles trapped between the rotating disc and the output window of the light valve projector.

2. Description of the Prior Art

Light valve projection systems of the Schlieren dark field type have been in commercial use for many years and are capable of providing excellent performance. Typical prior art color projection systems of this type are shown in U.S. Pat. Nos. 3,290,436, No. 3,352,592 and No. 3,437,746, all of which were issued to W. E. Good et al. The principles of operation of this type of projection system are briefly described with reference to FIGS. 1, 2 and 3 of the drawings.

With reference first to FIG. 1, there is schematically shown a single-gun television light valve assembly comprising a lamp 10, sealed light valve 12, and Schlieren projection lens 14. The sealed light valve 12 comprises a glass envelope which contains an electron gun 16, input slots 18, focus-deflection system 20, a control layer 32 on a rotating disk 22, and a fluid reservoir 24.

The electron gun 16 generates, from anode aperture 11, an electron beam which is used to "write" charge patterns on the control layer 32. These patterns create surface deformations in the layer and form light diffraction gratings. The electron beam is focused, deflected, and modulated by electrodes 23, 25, 27, and 21. The control layer surface deformations diffract and modulate the light rays passing through the layer 32 and disk 22.

The focus-deflection system 20 comprises three electrode sets each having four orthogonal electrodes, which form three electrode "boxes", referred to as boxes 23, 25 and 27, and a cylindrical electrode 21. The first of these, box 23, is arranged about the aperture in the input window and serves to center and allow predeflection of the electron beam. The next two boxes, boxes 25 and 27, have DC and AC voltages applied to them in a manner to achieve a uniformly focused electron beam image of aperture 11 which is scanned across the raster plane on control layer 32. This, in turn, permits the control layer fluid to be modulated uniformly by charge control to produce a uniformly colored projected image. following the focus-deflection boxes 25 and 27 is a drift ring 21 which serves, with a transparent electrode on disc 22, as an element of the final electron lens in the focus-deflection system 20.

Specific examples of light modulating fluids are disclosed in U.S. Pat. Nos. 3,288,927 to Ralph W. Plump, Nos. 3,317,664 and 3,317,665 both to Edward F. Perlowski, Jr., No. 3,541,992 to Carlyle S. Herrick et al, and No. 3,761,616 issued to C. E. Timberlake. These fluids may include additives as taught by U.S. Pat. Nos. 3,764,549 and 3,928,394 to David A. Orser. In general, the control layer or light modulating fluid is a very special chemical compound, modified with special additives, having the electro-mechanical and visco-elastic properties needed to produce effective control layer properties in the electron beam addressed light valve.

The basic light collection system includes an arc lamp 10, which may be a Xenon lamp, the arc of which is located at the focus of a reflector system, which may be a simple ellipsoidal reflector, as shown, or a compound reflector, as disclosed for example in U.S. Pat. No. 4,305,099 to Thomas T. True et al. The light from the arc is reflected from the reflector through a pair of spaced lens plates having corresponding pluralities of rectangular lenticules arranged in horizontal rows and vertical columns. The first lens plate is shown in FIG. 1 at 28 and the second lens plate is formed on the light input surface of the glass envelope of the light valve 12. The light from the lamp 10 is projected through a color filter plate 26 and the lenticular lens 28 before entering the light valve 12.

The interior surface of the glass envelope of the light valve 12 carries the input light mask in the form of slots 18 which, for example, may be applied by vapor deposition. The input slots 18 are a series of transparent slots and alternating opaque bars in a pattern generally as indicated in FIG. 1. The filtered light from the lamp 10 pass into the light valve 12 through these transparent slots. The lenslets of the lenticular lens 28 and the corresponding lenslets, formed on the light input surface of the glass envelope of the light valve 12, form condensing lens pairs which first focus spots of filtered light onto the slots of the light mask and then re-image the light rays onto the control layer raster plane 32. With this arrangement, efficient utilization is made of light from the arc lamp, and uniform distribution of light is produced, in a rectangular pattern, on the light modulating medium or control layer 32.

The Schlieren projection lens 14 includes Schlieren lens elements 29, output color selection bars 30 and a projection lens system 31. The output selection bars 30 are the complement of the input slots 18. That is, on the output bar plate, the bars are optically aligned with the slots of the input slots 18 so that, in the absence of a diffraction of light passing through the control layer 32, light rays are focused and terminated on the bars of the output bar plate. This creates a "dark field" condition, i.e., no light is transmitted in the absence of a modulating signal superimposed on the raster scanning signals applied to the horizontal and vertical deflection plates of the deflection system 20. It should be noted, however, that the electron beam which scans the raster and provides charge to the control layer is a constant current electron beam, there being no modulation of the intensity of the beam produced by the electon gun 16 (other than during the horizontal and vertical retrace intervals when the beam is off).

The lower half of FIG. 1 shows the cross sections of the light body and light valve components. The spectral diagrams at the bottom indicate how the light is prefiltered before entering the light valve.

FIG. 2 is a simplified light valve diagram showing the color selection action of the three basic gratings. The control layer 32 which is supported by the rotating disk 22 (shown in FIG. 1) is illustrated as having three different diffraction gratings for red, green and blue light components. These diffraction gratings may be written individually or simultaneously and normally are actually superimposed but, for purposes of illustration only, they are shown in FIG. 2 as separated on the control layer 32.

In the light valve projection system shown in FIGS. 1 and 2, green light is passed through the horizontal slots of the input bar plate 18 and is controlled by diffraction gratings formed by modulating the height of the scanned raster lines on the control layer 32. This is done by controlling the amplitude of a high frequency carrier applied to the vertical deflection plates as modulated by the green video signal as shown in FIG. 3. Magenta (red and blue) light is passed through the vertical bar plate 18 and is controlled by charge generated diffraction gratings created at right angles to the raster lines by velocity modulating the electron spot as it is scanned in the horizontal direction. In the example shown in FIG. 3, this is done by applying a 16 MHz (12 MHz for blue) signal to the horizontal deflection plates and modulating it with the red video signal as shown in FIG. 3. The grooves created in the control layer 32 have the proper spacing to diffract the red portion of the spectrum through the vertical output slots in plate 30 while the blue portion is blocked. (When the 12 MHz carrier is used, the blue light is passed by the vertical slots in plate 30 and the red light is blocked.)

Thus, three simultaneous and superimposed primary color pictures can be written with the same electron beam and projected to the screen 33 as a completely registered full color picture. Colors are created by writing miniture diffraction gratings within each picture element on the fluid surface by manipulating the single scanning electron beam. These gratings diffract the transmitted light rays away from their terminations at the output bars where they are spatially filtered to let the desired color reach the screen. The amount of light diffracted is dependent on the depth of the gratings formed in the control layer. This technique permits a full color television picture to be written on a single control layer with no need for further registration.

FIG. 3 shows in block diagram form the basic light valve projector circuitry. A composite video signal is supplied to the input of a decoder 34 which provides at its output red, blue and green video signals. These signals are respectively applied to modulators 36, 38 and 40. A grating generator 42 supplies carrier signals which, in the case illustrated, have frequencies of 16 MHz and 12 MHz, respectively, to modulators 36 and 38 and a signal having a frequency of 48 MHz to modulator 40. The outputs of the red and blue modulators 36 and 38 are combined and superimposed on the horizontal deflection signal from the horizontal deflection signal generator 44. The output of the green modulator 40 is superimposed on the vertical deflection signal from the vertical deflection generator 46.

The basic Schlieren dark field light valve projector as schematically illustrated in FIGS. 1, 2 and 3 has evolved over a period of years to be a highly efficient projector producing excellent quality pictures of good color balance and high resolution. The specific problem attacked by the subject invention pertains to entrapment of particles in the light modulating fluid between the rotating disc and the output window. These particles may come from several sources, one being the result of the mechanical contact of the spacers on the interior of the output window and the rotating disc. The purpose of these spacers is to maintain a spacing between the rotating disc and the output window of about 3.5 mils. Without these spacers, the rotating disc would come to rest with its surface in full mating contact with the interior of the output window. The resulting mating contact would prevent the initiation of rotation of the disc. So, while the spacers are an important design feature, they sometimes lead to the generation of particles in the light modulating fluid during the course of the life of the light valve. The filtering system which is built into the prior art light valves may not be effective in eliminating these particles, or any other particles regardless of their origin, when they become entrapped between the rotating disc and the output window. The particles tend to remain between the rotating disc and the output window resulting in diffraction of light rays and projection of a donut shaped images on the screen. In some very early demountable light valve projector units, an oil dripper positioned above the disc adjacent to the space between the disc and the output window was used to drop fluid into this space in an effort to encourage change of the fluid between the disc and the output window. This approach was not successful since the fluid tended to run around the edge of the disc rather than between the disc and the output window. Thus, the problem has persisted for a long time.

SUMMARY OF THE INVENTION

It is an object of this invention to provide improvements in the design and manufacture of light valve projection systems of the Schlieren dark field type.

It is another more specific object of the invention to provide and maintain the space between the rotating disc and output window in a light valve projection system free of particles.

It is a further object of the present invention to provide a continuous cleaning of the space between the rotating disc and the output window and additionally minimize the disc support pad wear.

The objects of the invention are accomplished by injecting a small amount of filtered fluid into the space between the rotating disc and the output window. This is done by injecting the fluid through the center of the disc bearing, thereby providing a uniform radial flow outwardly from the center and flushing out any particles in the space and preventing any particles from the surrounding fluid or generated by the disc support pads from moving into the raster area. By properly regulating the flow of center flush fluid, the disc can be floated off the support pads during rotation by approximately one half mil. This reduces wear generated particles which contribute to substrate buildup and subsequent loss of light throughput. A secondary advantage realized by floating the disc off the support pads is the reduction of erratic disc motion caused by a stick and slip frictional effect due to the glass disc rubbing on the disc support pads.

BRIEF DESCRIPTION OF THE DRAWINGS

The foregoing and other objects, aspects and advantages of the invention will be better understood from the following detailed description with reference to the drawings, in which:

FIG. 2 is a simplified perspective view illustrating the principles of operation of the prior art light valve projection system;

FIG. 3 is a block diagram showing the basic circuitry of a modulated deflection system of the prior art light valve projection system;

DETAILED DESCRIPTION OF THE PREFERRED EMBODIMENT OF THE INVENTION

Figure 4:
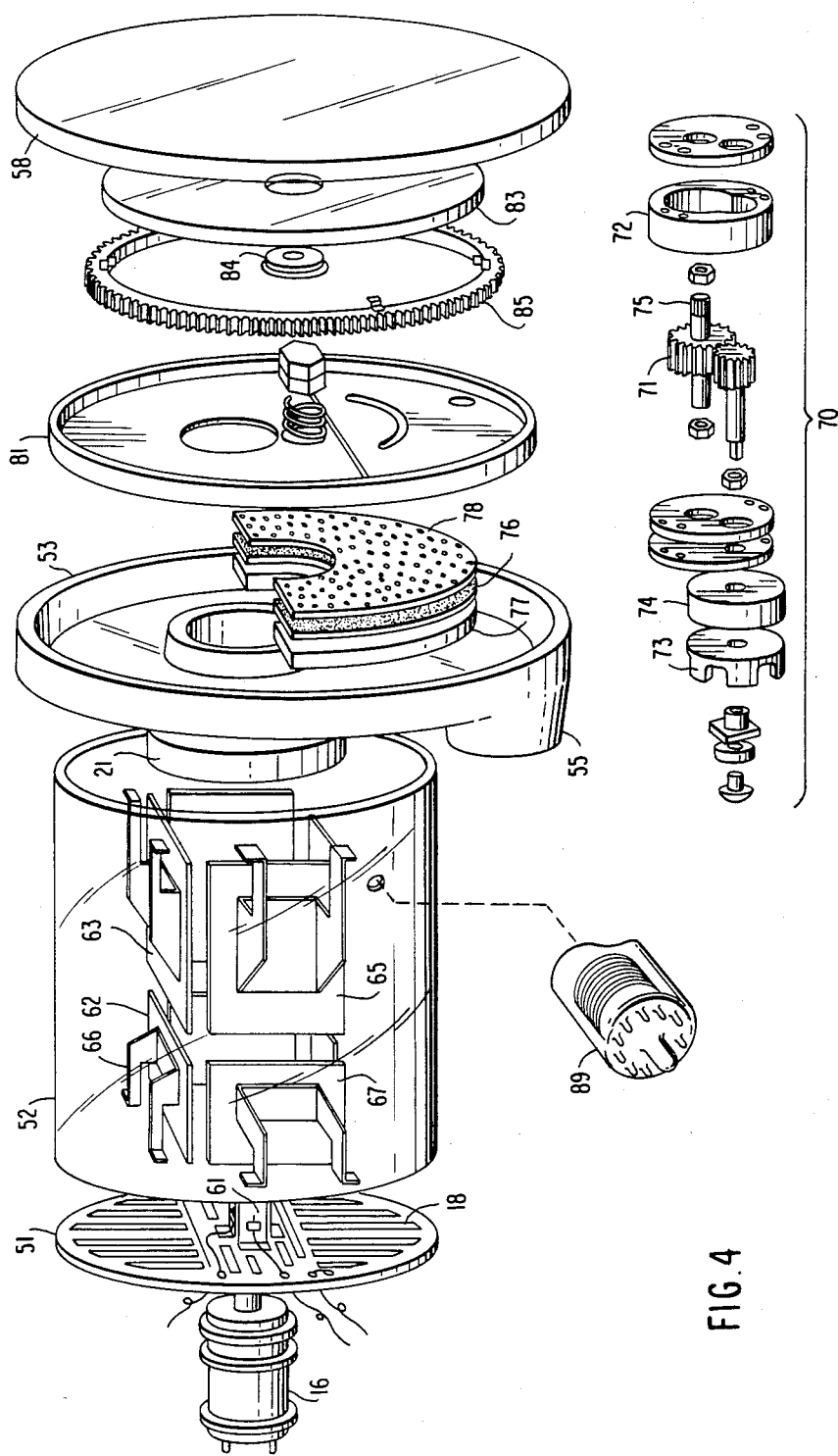
FIG. 4 is an exploded perspective view of major elements of a new generation of light valves which embody the invention.

In the drawings, like reference numerals used in the several figures indicate the same or corresponding components. Referring again to the drawings, and more particularly to FIG. 4, there is shown an exploded view of the internal vacuum components of the new generation Schlieren dark field light valves. The vacuum enclosure comprises an input window 51, a focus deflection cylinder 52, a rear housing 53 which has a molded recess 55 for receiving a pump assembly 70, and a face plate 58. The electron gun assembly 16 is attached to a central aperture of the input window 51, and the input slots or bar plate 18 are formed on the interior surface of the input window 51, functionally similar to the earlier light valves of this type.

The focus and deflection assembly comprises three sets of electrodes. One set of four electrodes 61, comprising a pair of horizontal plates and a pair of vertical plates, is attached to the input window 51 about its central aperature. A pair of vertical deflection plates 62 and a pair of horizontal deflection plates 67 located within the cylinder 52 form the second set. The third set is comprised of the vertical deflection plates 63 and the horizontal deflection plates 65. As shown in FIG. 4, the deflection plates 62, 63, 65, and 67 are supported within the cylinder 52 by means of brackets 66 which also provide the electrical connections to the deflection plates. Beyond the deflection plates 63 and 65 and within the rear housing 53 is a cylindrical drift ring 68 which, with a transparent electrode on disc 83, completes the focus-deflection system.

A gear pump assembly, generally indicated at 70, is located within recess 55 of the rear housing 53. The gear pump comprises gears 71 within a housing 72 driven by a magnet 73. The magnet 73 is coupled to a rotating magnet driven by an electric motor (not shown) axially aligned with the pump 70 on the exterior rear face of the recess 55 that houses the pump. An axial shield 74 is provided for the magnet 73 so that its magnetic field does not affect the electron beam. Other magnetic shielding is provided within the light valve projection system to prevent the electron beam from being affected by magnetic fields at the projector or due to the earth° s magnetic field.

Figure 1:
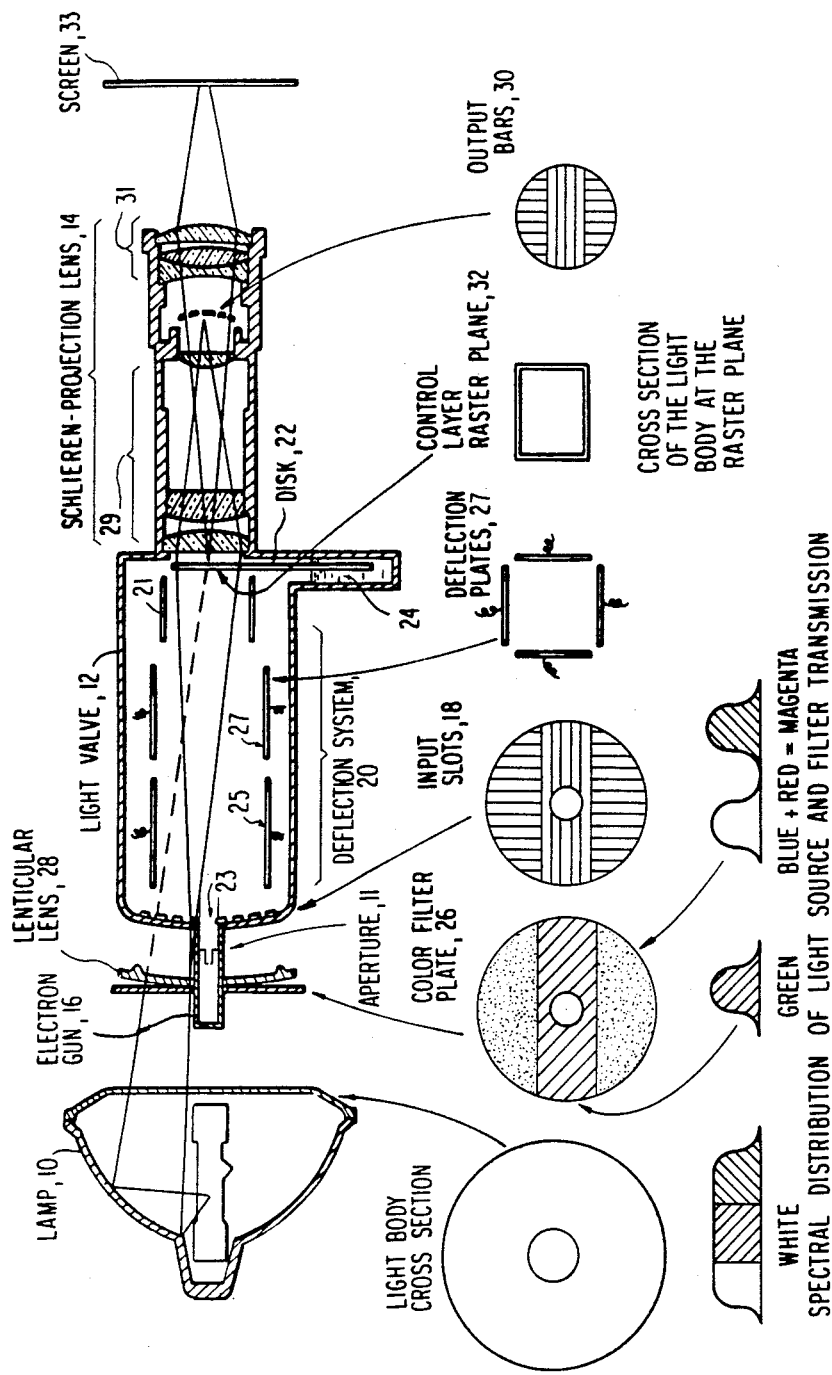
FIG. 1 is a simplified cross-sectional view showing the construction of a prior art light valve projection system.

The rear housing 53, including the recess 55 which houses the pump assembly 70, and the face plate 58 generally define the reservoir 24 (schematically illustrated in FIG. 1) which contains the fluid. The gear pump 70 is located in that reservoir and operates to pump the fluid through a filter 76. The filter 76 is sandwiched between a filter housing 77 and a perforated panel 78, and this assembly is secured to the lower rear face of a baffle 81. The baffle 81 is a generally circular disk with a forwardly projecting flange which surrounds the rotating disc 83. The disc 83 is supported for rotation by a bearing 84 through which projects a pin mounted in the center of baffle 81. A ring gear 85 is attached to the peripheral edge of the disk 83 and is driven by a pinion gear 75 that projects from the gear pump 70.

Attached to the side of the cylinder 52 is a vacuum maintenance device 89, which collects gaseous materials remaining in the envelope after it is sealed and which are generated as a product of the operation of the light valve.

Figure 5B:
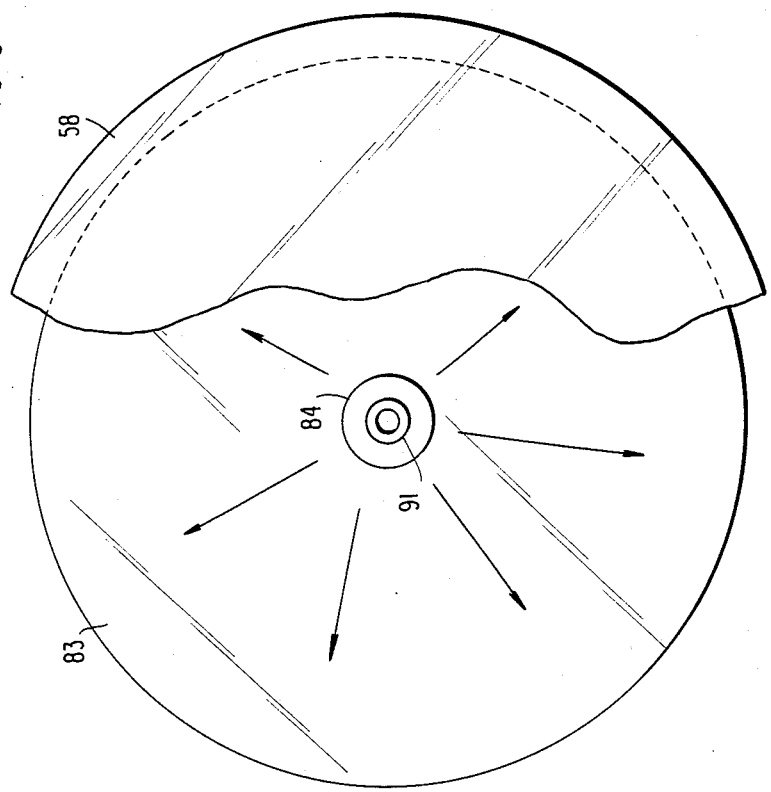
FIGS. 5A and 5B are, respectively, side and plan views of the rotating disc and output window showing the principles of operation of the invention.
Figure 5A:
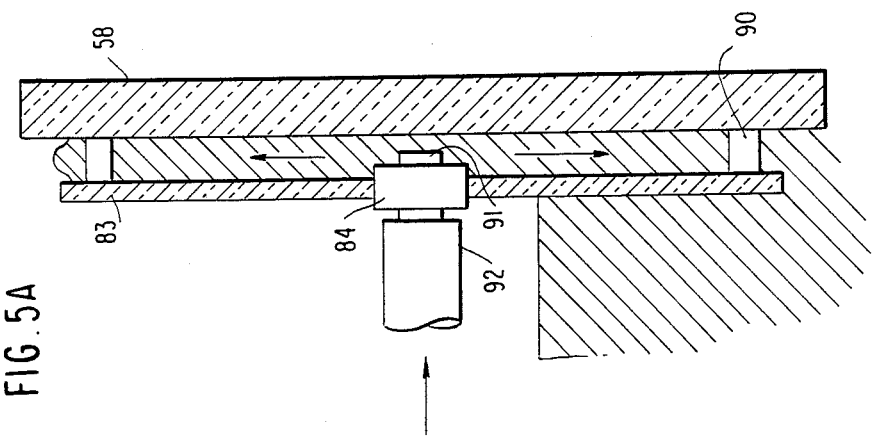

Referring now to FIGS. 5A and 5B, the disk 32 (83 in FIG. 4) and the output window 58 are shown with fluid in the space between them. In FIG. 5A, it will be noted that the disk 32 is supported by pads 90 which are tabs captured by the ring gear mounting. There are three of these pads, and they are approximately 3.5 mils in height. It will also be noted in FIG. 5A that the fluid between the disk 32 and the output window 58 is at a height significantly above that of the reservoir level due to capillary action. The fluid acts as a fluid cushion between the rotating disk and the ouput window but, without the present invention, does nothing to cause fluid flow or to prevent the mechanical rubbing of the pads 90 on the output window 58. This mechanical rubbing generates particles which can become entrapped between the disk 32 and the output window 58.

According to the present invention, the pin 91 on which the disk bearing 84 is supported is drilled out and connected by means of the tube 92 to the gear pump 70 (see FIG. 4). In this way, a small portion of the filtered fluid from the gear pump is supplied through tube 92 and the passage through pin 91 to the space between the disk 32 and the output window 58. The fluid supplied to this space flows radially outward as indicated by the arrows in FIG. 5B. The flow produced is effective to flush out any particles which may become entrapped in the space between the disk 32 and the output window 58.

By adjusting the pressure of the fluid supplied by the gear pump to the space between the disk 32 and the output window, it is possible to float the disk 32 and the pads 90 off the output window 58 by approximately one half mil thereby eliminating the mechanical rubbing contact between the pads and the output window. This has the effect of greatly reducing the generation of particles from the source although it does not entirely eliminate the same since there is unavoidably some rubbing contact when the light valve is initially started and when it is turned off. The second benefit that is realized is the reduction of erratic disk motion caused by the stick and slip frictional contact between the pads 90 and the output window 58.

The invention has proved to be very effective in eliminating defects in the projected image due to foreign particles. The backside disk flushing action eliminates particles from whatever source which may become entrapped between the disk and the output window of the light valve. The result has been improved projected image quality and, secondarily, improved operation of the light valve itself.

Those skilled in the art will recognize that while the invention has been disclosed in terms of a single preferred embodiment, it may be practiced with modifications and variations within the scope of the appended claims.

Having thus described my invention, what I claim as new and desire to secure by Letters Patent is as follows:

1. In a light valve of the Schlieren dark field type having a rotating disc spaced from an output window, the space between the rotating disc and the output window being filled with a fluid, the improvement comprising:

bearing means for rotationally supporting said disc, said bearing means having a fluid passage; and pump means for supplying said fluid under pressure to said fluid passage in said bearing means to cause fluid to flow radially outward in the space between said rotating disc and said output window whereby any particles in said space are flushed out.

2. In a Schlieren dark field light valve including:

a vacuum envelope having an input window, a focus deflection cylinder, a rear housing, and a faceplate including an output window, a portion of the space between said rear housing and said faceplate defining a reservoir;

an electron gun positioned in a central aperture of said input window;

a focus and deflection assembly supported within said focus deflection cylinder;

a baffle in said space between said rear housing and said faceplate, said baffle having a central bearing;

a rotatable disc supported on said central bearing, said rotatable disc partially projecting into said reservoir;

a fluid in said reservoir, said fluid coating said rotatable disc and filling the space between said rotatable disc and the area of said output window of said faceplate; and a pump and filter located within said reservoir between said baffle and said rear housing and operable to continuously clean said fluid by pumping and filtering; wherein the improvement comprises a conduit connected between said pump and filter and said bearing; said bearing having a fluid passage therethrough to supply fluid which flows radially outward under pressure to the space between said rotatable disc and said output window of said faceplate to float said disc on said fluid and to flush out any particles in the space between said disc and said output window.

3. A method of maintaining a space between a rotating disc and an output window of a light valve of the Schlieren dark field type substantially free of particles comprising the step of supplying fluid under pressure to a central portion of said space so that the fluid flows radially outward and thereby flushes out any particles which may come into said space.

* * * * *